Dec. 7, 1965 S. GEWIRTZ 3,222,600

ASYMMETRICAL DIFFERENTIAL AMPLIFIER MEASURING CIRCUIT INCLUDING TRANSISTORS AND THERMAL COMPENSATION MEANS

Filed March 26, 1962

INVENTOR.
STANLEY GEWIRTZ

BY Samuel J Stree [signature]

ATTORNEY

United States Patent Office 3,222,600

Patented Dec. 7, 1965

3,222,600

ASYMMETRICAL DIFFERENTIAL AMPLIFIER MEASURING CIRCUIT INCLUDING TRANSISTORS AND THERMAL COMPENSATION MEANS

Stanley Gewirtz, New York, N.Y., assignor to Solid State Systems, Inc., New York, N.Y.

Filed Mar. 26, 1962, Ser. No. 182,510
4 Claims. (Cl. 324—123)

Figure 1:
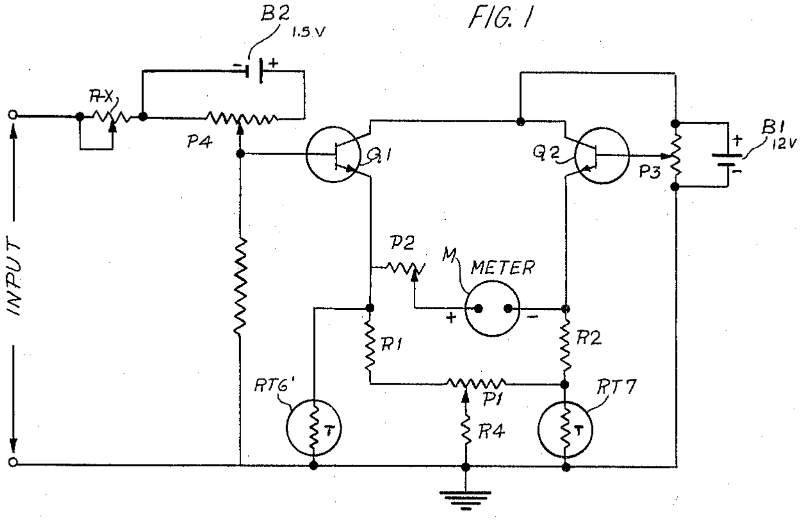

This invention relates to method and apparatus for increasing the sensitivity and impedance of a meter while maintaining linearity, accuracy, and stability, and is a continuation-in-part of applicant's pending application for United States Letters Patent, Serial Number 83,307, filed January 17, 1961. More particularly, this invention relates to method and apparatus for attaining the above-mentioned result by employment of a special differential amplifier comprising a novel temperature-neutralizing means.

The general object of the invention is to provide a new and useful method and apparatus of this class; and, specifically, the object is to increase the sensitivity and impedance of a current meter while maintaining its linearity, accuracy, and stability by using a two-transistor differential amplifier circuit including novel temperature-neutralizing means.

It is an object of the invention to provide a circuit adapted for use with transistor voltmeters and other meters, instruments, and controls requiring amplification and a high degree of linearity, accuracy, and stability, the circuit including means for neutralizing the effects of the thermally-generated forbidden gap voltage and enabling the circuit to have an absolute zero admittance level; i.e., no current flows from the test circuit into the system or source which is being measured, so as to make feasible dependable amplification and detection of even the smallest signal.

By reason of its parameters, this circuit is adaptable to any pair of moderate-gain small-signal transistors, and is equally operable with n-p-n and p-n-p transistors of any manufacture. The transistors indicated in the drawing may be assumed to be n-p-n transistors of the 2N169 type. By reversing battery and meter polarities, p-n-p transistors may be used to the same advantage.

One of the features of the circuit is its economy of manufacture, due to low-cost components and simple assembly procedures. Another feature is the circuit's economical use of power. Typical maximum power consumption is approximately two milliwatts at full meter deflection. This renders the circuit uniquely portable by making possible accurate and stable performance from a power source for a longer period than those of present circuits designed for similar purposes.

The use of transistors and other long-lived components makes this circuit freer from maintenance and replacement problems associated with other means of amplification and measurement. The sensitivity and input impedance of the circuit may be as high or as low as design parameters cause them to be. With the values indicated hereinafter and in the drawing with respect to the circuit about one microwatt is required for full-scale deflection of a fifty-microampere-one-volt meter movement.

Because of inherent high-stability, several of these circuits can be connected in series for greater sensitivity and input impedance, while enabling the designer to use less sensitive, and therefore less expensive, current meters. The fact that the circuit comprises a differential amplifier affords it even greater independence of temperature and voltage changes.

One object of the present invention is to provide circuit means applied to amplification circuits which may possess their own thermally generated electromotive forces or other semiconductor electromotive force for creating an absolute zero admittance level so as to make feasible dependable amplification and detection of even the smallest signal.

In brief, a feature of the present invention is its neutralization by the addition of a subtractive quantity—that is, a quantity of the same value as that presented by the semiconductor is presented in opposition to the voltage generated by the semiconductor, whereby the sum of two electromotive forces of equal magnitude but of opposite signs cancel each other out and effect an admittance level of zero, therefore there is no inherent current flow within the circuit. Another feature hereof is attainment by compensation of the ultimate in input impedance stability without changes in temperature effecting zero shift.

These and other objects, features, and advantages hereof will be more fully understood from the following description and claims, and from the drawing, which is diagrammatic.

Figure 2:
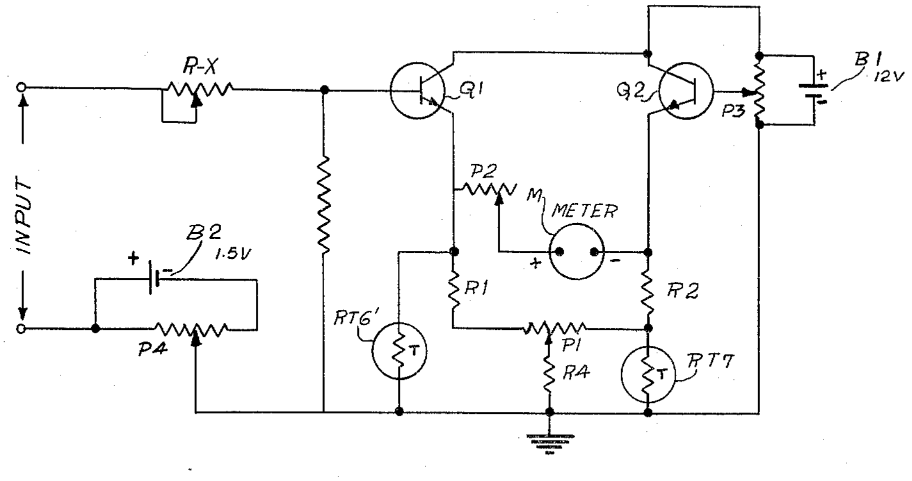

FIGURES 1 and 2 are schematic diagrams of the measuring circuit.

In the disclosure of the parent application a circuit was shown having two input transistors. The circuit had a grounded input. This input had a temperature-dependent condition which was adjusted by the use of a voltage divider including a thermistor, potentiometer and battery connected in series with the input circuit. The higher the temperature, the lower the resistance of the thermistor, and the more positive the grounded input became with respect to emitters and bases of the input transistors. This in turn resulted in the neutralization of any voltage that was thermally generated at the input of the circuit.

According to the present invention, an undesired thermally generated electromotive force can be neutralized by placing a battery and voltage divider in any number of positions in a transistorized circuit to effect neutralization of thermally or semiconductor-generated electromotive forces.

One form of the invention is illustrated in the present drawing. A resistor R4 is connected between zero adjustment potentiometer P1 and ground. A voltage source B2 is connected in parallel with a potentiometer-and-voltage-divider network P4. This divider network is connected in series with input transistor Q1 and bucks out or neutralizes any thermal electromotive force generated by said transistor.

A modification would be to leave resistance R4 or its equivalent in place and to tie it to the common point, and to place the divided voltage source in series with this common point in the input circut on the ground side. This modification would accomplish neutralization of semiconductor potentials.

When components are placed in series in a loop network, regardless of their positions in the network, as long as their functions remain the same, the result of their positioning is immaterial.

The invention includes an addition to the circuit which will stabilize the input impedance of the circuit to essentially the ultimate conceivable degree for application of the circuit to high caliber computer systems or test and measurement equipment where a relationship of preamplifier series divider networks and an exact input impedance of the amplifier is to be maintained, and to eliminate the need for adjustments of an externally located zero adjustment potentiometer.

In the circuit shown P1 is a zero adjustment potentiometer. By connecting resistor R4 directly to ground, there would normally be an increase in input impedance as the ambient temperature at which the circuit had to operate were increased. This may be compensated for, however, by connecting a similar coefficient thermistor RT6′ between the emitter of transistor Q1 and ground. The action of the newly-placed thermistor RT6′ is effective only for the emitter of transistor Q1 and consequently results in an unbalancing of the zero adjustment circuit. To remedy this situation, and to eliminate repeated manual adjustment of potentiometer P1, for maintaining a constant input impedance in the circuit employing thermistor RT6′, another thermistor, or negative temperature coefficient resistor RT7 is added. This latter component is connected at the junction of resistor R2 and potentiometer P1, and ground. The purpose of thermistor RT7 is to accomplish an offset of the zero adjustment equivalent to the offset accrued by thermistor RT6′. By properly choosing the values of thermistors RT6′ and RT7 the two offsets occurring simultaneously with a temperature change cancel each other out, resulting in the equivalent effect of having manually adjusted such a potentiometer as P1.

Thus, by using the two thermistors RT6′ and RT7 in the manner described, better control of the input impedance of the circuit is had without loss of any of the previously described advantages.

What is claimed is:

1. A metering circuit for measuring voltage applied across two input terminals of said circuit, comprising in combination:
   (a) a current responsive meter;
   (b) a first transistor having a base, emitter and collector;
   (c) a second transistor having a base, emitter and collector; said emitters of the two transistors being connected to opposite ends of the meter, said two transistors forming a part of an asymmetrical differential amplifier;
   (d) a first potentiometer including:
      (1) a first fixed resistor connected at opposite ends to respective opposite terminals of said meter, and
      (2) a movable tapping arm;
   (e) a second fixed resistor connected between ground and said tapping arm;
   (f) a first direct current source;
   (g) a second potentiometer including
      (1) a fixed resistor connected across opposite terminals of said direct current source, and
      (2) a movable tapping arm connected to the base of the second transistor;
   (h) one terminal of said direct current source being connected to the collectors of the two transistors, the other terminal of said direct current source being connected to ground;
   (i) a first one of said two input terminals being connected to ground, the other of said input terminals being connected to the base of the first transistor; and (j) voltage supply means having a polarity opposite to that of the thermally generated electromotive force of said transistor for neutralizing currents generated thermally therein, said voltage supply means being connected in series circuit between one of said two input terminals and the differential amplifier.

2. A metering circuit according to claim 1, wherein said voltage supply means comprises:
   (a) a second direct current source; and
   (b) a potentiometer including:
      (1) a fixed resistor connected across opposite terminals of the second direct current source, and
      (2) a tapping arm connected to the base of the first transistor;
   (c) one end of the last named fixed resistor and one terminal of the second direct current source being connected to said other of the two input terminals.

3. A metering circuit according to claim 1, wherein said voltage supply means comprises:
   (a) a second direct current source; and
   (b) a potentiometer including:
      (1) a fixed resistor connected across opposite terminals of the second direct current source, and
      (2) a tapping arm connected to ground;
   (c) one end of the last named fixed resistor and one terminal of the second direct current source being connected directly to said first input terminal.

4. A metering circuit according to claim 1, further comprising:
   (a) means for stabilizing input impedance of the metering circuit comprising:
      (1) a first resistive element having a negative temperature coefficient of resistance, connected between the emitter of the first transistor and ground, and
      (2) a second resistive element having a negative temperature coefficient of resistance similar to that of the first resistance element, connected in series with a resistor between the emitter of the second transistor and ground.

References Cited by the Examiner

UNITED STATES PATENTS

| | | | |
|---|---|---|---|
| 2,016,894 | 10/1935 | Faus | 324—105 |
| 2,481,500 | 9/1949 | Crowl | 324—131 |
| 2,887,540 | 5/1959 | Aronson | 330—23 |
| 2,903,524 | 9/1959 | Howell | 330—69 |
| 3,063,010 | 11/1962 | Richardson | 324—62 X |

FOREIGN PATENTS

| | | |
|---|---|---|
| 800,506 | 8/1958 | Great Britain. |

OTHER REFERENCES

Slaughter: IRE Transactions—Circuit Theory, March 1956, pages 51–53.

WALTER L. CARLSON, *Primary Examiner.*

NATHAN KAUFMAN, *Examiner.*